United States Patent [19]

Silva et al.

[11] 4,293,572

[45] Oct. 6, 1981

[54] PROCESS FOR APPLYING A MOISTURE BARRIER COATING TO BAKED AND FRIED FOOD PRODUCTS

[75] Inventors: Roy Silva; David J. Ash, both of Norwalk, Conn.; Clement E. Scheible, Rye, N.Y.

[73] Assignee: International Telephone and Telegraph Corporation, New York, N.Y.

[21] Appl. No.: 75,615

[22] Filed: Sep. 14, 1979

Related U.S. Application Data

[63] Continuation-in-part of Ser. No. 881,935, Feb. 28, 1978, abandoned.

[51] Int. Cl.³ ............................................. A21D 13/00
[52] U.S. Cl. ....................................... 426/19; 426/94; 426/103; 426/303; 426/307; 426/602; 426/439
[58] Field of Search ............... 426/302, 303, 307, 308, 426/310, 62, 103, 89, 602, 608, 611, 612, 659, 661, 439, 94, 19

[56] References Cited

U.S. PATENT DOCUMENTS 3,223,532  12/1965  Pinkalla et al. .................... 426/602
3,814,819  6/1974   Morgan .............................. 426/103

OTHER PUBLICATIONS

*Baking Science & Technology,* Plyer, Siebel Pub. Co. Chicago, Ill.; 1974; pp. 1005–1007.
*Ida Bailey Allen's Cookbook,* Allen; Garden City Pub. Co. N.Y.; 1937, pp. 442–443.

*Primary Examiner*—Joseph M. Golian
*Assistant Examiner*—Elizabeth A. Hatcher
*Attorney, Agent, or Firm*—John T. O'Halloran; David M. Quinlan

[57] ABSTRACT

A composition of matter comprising a water in oil emulsion or colloidal dispersion prepared from an emulsified triglyceride or an emulsifier only in combination with an aqueous solution of a dextrin or other soluble saccharides or polysaccharide. The emulsion, prepared by the addition of heat and agitation, is thereafter applied to the surface of a food product by dipping, enrobing, spraying or any other suitable application means to the food product, the excess is removed by suitable means and the coating is allowed to set or dry prior to further processing or packaging of the food. Coating thickness, pick-up and setting of the coating is accelerated by control of both the temperature of the coating composition of matter at the time of application and the surface temperature of the food product.

4 Claims, No Drawings

PROCESS FOR APPLYING A MOISTURE BARRIER COATING TO BAKED AND FRIED FOOD PRODUCTS

This is a continuation-in-part of application Ser. No. 881,935, filed Feb. 28, 1978, now abandoned.

BACKGROUND OF THE INVENTION (a) Field: Protective Coatings for Foods
(b) Prior Art One of the prevalent problems existing in the bakery industry relates to the matter of staling as perceived by a firming of the food product due to moisture loss. In addition, in certain bakery type food products, and particularly in relation to donuts the starch portion is subject to retrogradation. Of the two types of problems the firming of the crumb due to the moisture loss as apparent drying contributes the major portion of the perceived staleness or hardening of baked or fried products. This problem is particularly acute when it comes to the matter of donuts and is so severe in yeast raised donuts as to bring about a situation in which yeast raised donuts have a very limited shelf life measured in terms of hours.

The baking industry has long sought a yeast raised donut which has a substantial shelf life measured in terms of days rather than hours. In order to mass produce donuts, whether of the cake or particularly the yeast raised type, and to allow for distribution in a normal manner and display in normal retail outlets, a period of days is required. To some extent cake type of donuts are not as subject to the severe crumb drying and perceived staleness as yeast raised donuts are. In an experiment, donuts were stored without coating or glaze in polyethylene bags. The donuts became firm and slightly mealy, which is a typical staling effect, after 2 to 3 days but did not dry out, thus remaining edible. When the same experiment was repeated using the donuts which had a sugarwater-stabilizer glaze applied, the donuts firmed very rapidly and were unsatisfactory within 24 to 48 hours. The rapid firming was concluded to be due to moisture migration from the donut's crumb to the glaze coating.

The water content of a packaged multicomponent baked or fried product will migrate from the high vapor pressure components to low vapor pressure components until equilibrium is reached. The vapor pressure, which can be determined individually for each component, is controlled by the amount of water, the amount of soluble solids and the amount of water binding agents. In the case of a yeast raised glazed donut, the glaze is a saturated sucrose solution having a relatively low vapor pressure, while the yeast raised donut has a relatively high vapor pressure due to the lack of appreciable soluble solids (low initial sugar much of which is metabolized), relatively high water content and a minimum of water binding ingredients. The overall effect is a rapid moisture migration from the crumb through the surface of the donut to the glaze which not only dries and therefore firms the crumb, but also supersaturates the glaze solution and leads to a breakdown of the glaze.

The glaze breakdown mechanism may be described as follows: The glaze consists of small sucrose crystals (powdered sugar) held together and bonded to the donut surface by a saturated sucrose solution (syrup). The ratio of sucrose crystals to syrup controls the firmness, the opacity, and the eating character of the glaze.

The major difference between a glaze and a flat icing is a higher crystal to syrup ratio for the icing. As the moisture migrates from the donut crumb to the glaze the syrup is diluted and the sugar crystals are dissolved. When there is insufficient amount of solid sugar crystals left to hold the glaze intact and when the syrup phase becomes predominant, the glaze liquifies, runs off, soaks into the product, sticks to the wrapper and is characterized by the term known in the art as glaze breakdown.

The interpositioning of a water barrier between the surface of the donut and the glaze would restrict moisture migration and thus prevent the donut crumb from drying out and protect the glaze from breakdown.

Use of water barriers on food products including baked and fried products is now new. "Crystal Gum", a tapioca dextrin sold by National Starch and Chemical Corporation, Bridgewater, N.J., has been utilized as an aqueous dextrin sucrose spray applied to baked cake and pie products prior to icing or glazing to extend the shelf life of the products and to minimize glaze and icing breakdown. In addition, there are many literature and patent references describing the use of coatings on food products to reduce moisture loss or migration. Most such work has been done on meat products which are, of course, processed and cooked prior to consumption. In fruit the coating is removed with the peeling and thus does not interfere with the eating properties. On nonporous semi-smooth products such as nuts, candies and the like, various coatings of various carefully controlled thicknesses have been utilized for a similar purpose.

None of the prior art coating materials or methods have been satisfactory in accomplishing the desired goals of a shelf stable yeast raised glazed donut. It must be understood that donuts bring about particularly acute conditions which require a special composition and coating technique in order to achieve a satisfactory product. The water barrier or precoat applied to a freshly fried donut of either the cake or yeast raised type, but particularly the yeast raised type, must be an effective water barrier to the very porous donut surface and at the same time must not detract from the eating qualities of the donut. The coating must have a substantial amount of flexibility so that it does not crack or chip during subsequent glazing, icing or packaging of the product.

With these general requirements in mind, the following is a review of the available prior art literature and patents as compared to the specific compositions and processes described hereinafter for producing a satisfactory water barrier on a baked or fried food product with particular emphasis on the critical requirements for a glazed yeast raised donut. In an article by Allen, L., et al, "Edible Corn-Carbohydrate Food Coating", I, Food Technology at Pg. 99, November 1963 and II, Food Technology at Pg. 104 November 1963, there is a description of corn starch or corn sugars in combination with alginates used as moisture and oxygen barrier films on meat products. The articles specifically refer to an adverse flavor effect which would be amplified if the same type of coating or film were to be applied to a yeast raised donut.

In an anonymous article—"Outlook for Grapes: Better Raisins", Canner Packer, at Pg. 52, March 1977, it is taught that protein coatings from egg or soy have been found to effectively reduce moisture loss in raisins. Such protein coatings have been evaluated and they have been found to have very poor water barrier properties when applied to a porous donut surface. In addition they were found to be too difficult to apply for commercial operations.

An article by Ayres, J. C., "Use of Coating Materials", Food Technology, at Pg. 512, Sept. 1959, there is a listing of earlier precoat work and a teaching that an agar-glycerol solution or diacetyl triglycerides, when used as meat coatings, are for the purpose of primarily to retard microbiological growth. The films described are strippable and the moisture barrier properties of the agar films were minimal. The diacetyl triglycerides are described as having good moisture barrier properties, however evaluation of that type of coating on yeast raised donuts based on our experiences with fat based coatings would raise severe thickness control problems and the eating properties of these films on a porous donut surface would be unacceptable. Furthermore the heat stability of the diacetyl triglyceride coating would not be satisfactory in view of the subsequent glazing operation.

In Bauer, C. D., et al U.S. Pat. No. 3,406,081, Oct. 15, 1968, there is a description of a lipid meat coating applied as water in oil emulsion. The application as an emulsion would eliminate the normally brittle character of straight lipid coatings. The precoating of this invention is also applied as a water in oil emulsion and it may be its use as an emulsion which allows satisfactory weight control and the excellent flex properties of the precoat compositions of this invention.

In Bauer, C. D., U.S. Pat. No. 3,483,004, there is a teaching of the addition of thermal gelling methylcellulose to the composition described in Bauer, et al, U.S. Pat. No. 3,406,081 for the purpose of preserving the coating during cooking of the meat. This is unrelated to the composition and methods of this invention.

In Canonne, J. E., U.S. Pat. No. 4,010,283, there is a description of a use of a gum arabic coating. Such coatings were evaluated during the course of our work and it has been found that dextrin coatings are superior to gum arabic coatings. However, a dextrin coating alone was unsatisfactory for yeast raised donuts and accordingly it is highly unlikely that gum arabic coatings would be satisfactory for yeast raised donuts.

In Clark, W. L. "Hot Melt Transparent Peelable Coating for Food", Food Technology at Pg. 105, October 1965, there is described an acetylated monoglyceride-cellulose acetate butyrate coating. Cellulose acetate butyrate was added to overcome lack of transparency and to satisfy the need for plasticizers when straight acetylated monoglycerides are used. The coating is a peelable film and would not be applicable to a porous baked food product. Additionally transparency is not a problem with a precoat composition of this invention and satisfactory flexibility of the coating has been achieved without the use of the special additives taught in this article.

In the article by Feuge, R. O., "Acetoglycerides-New Fat products of Potential Value to the Food Industry" Food Technology at Pg. 314, June 1955, there is discussion of properties and potential use of acetylated monoglycerides. In this article, the use of acetylated monoglycerides as potential coating agents is addressed to their waxy character an while the author refers to potential use as coatings on baked products, no details are given.

In Hamdy, M. M. U.S. Pat. No. 3,471,304, there is the teaching of utilizing a combination of acetylated monoglyceride and ethyl cellulose for the purpose of overcoming negative qualities of either component when used separately as a coating material.

In Hullinger, C. H. "Starch Film and Coating", Cereal Science Today at Pg. 508, October 1969, there is discussion of starch films which, since they have poor water barrier properties, are not suitable for use in accordance with the teaching of this invention.

In the article by Jokay, L. "Development of Edible Amylaceous Coatings For Foods", Food Technology at Pg. 12, August 1967, there is discussed the advantages of hydroxypropyl derivatives of amylose starch over other starch coating materials. This type of coating does not have good moisture barrier properties. In addition this article does, however, discuss various prior art coating application equipment and contains literature references to such prior art coating equipment.

In the article by Lazarus, C. R., "Evaluation of Calcium Alginate Coating", Journal of Food Science at Pg. 639, Vol. 41 (1976), there is discussed the in situ precipitation of calcium alginate to form a film. Such films were evaluated during a course of our work and were found to be unacceptable since they have gel like eating properties when applied to donuts, which materially interferes with the eating qualities of the donuts.

In Lowe, E. "Continuous Raisin Coater", Food Technology at Pg. 109, Nov. 1963, there is a discussion of an acetylated-lipid coating. This type of coating was tested during our work on donuts and it was found that the porosity of the donut, coupled with the inability to apply a thin yet continuous coating, limited their use either due to unsatisfactory eating character or to poor moisture barrier properties.

In the article by Myer, R. C., "Edible Protective Coating for Extending the Shelf Life of Poultry", Food Technology at Pg. 146, February 1959, there is a description of a agar-glycerine and carrageenan coating utilized as moisture barriers on poultry. Such a coating would have a tendency to produce gel like eating properties when applied to porous products such as donuts and accordingly would be unsatisfactory.

In an article by Miers, J. C. "Pectinate and Pectate Coating", Food Technology at Pg. 229, June 1953, there is a description of calcium precipitated pectinate coatings. (See also Swenson, H. A. "Pectinate and Pectate Coating" Food Technology at Pg.. 232, June 1953). Such coatings were investigated during the course of our work and were found to have unacceptable gel-like eating properties.

An article by Murray, D. G., "Low DE Corn Starch Hydrolysates," Food Technology at Pg. 32, March 1973, describes the general purpose of low DE corn syrup solids and its successful use of such a moisture barrier coating on fruits and nuts. We have found that such low DE solids alone do not provide sufficient moisture protection when applied to donuts but are one of the components of the composition of matter of this invention, all of which together have a synergistic result of producing a satisfactory precoat water barrier on donuts.

In an article by Newman, A. A., "The Acetoglycerides", Food Manufactures at Pg. 525, November 1962, there is an overview of acetylated monoglycerides similar to the description contained in the article by Feuge referred to above. The list at the end of the description of the text makes no reference to the use of such materials on baked goods.

In an article by Paredes-Lopez, O. "Use of Coating of Candelilla Wax for the Preservation of Limes", J. Sci.

Fd. Agric. at Pg. 1207, Vol. 25, 1974, there is a description of the application of a wax emulsion as a moisture barrier to limes. This would have similar limitations to its use in conjunction with yeast raised donuts as the products referenced in the Bauer, U.S. Pat. No. 3,406,081, described above.

In Stemmler, M., U.S. Pat. No. 3,851,077, there is described the use of acetylated monoglyceride as a protective coating on fresh meat. As described in conjunction with the Lowe article referenced above, this type of coating is not satisfactory on donuts.

The Ukai, N., U.S. Pat. No. 3,997,674 describes a coating composition comprising an aqueous solution or dispersion of a water soluble polymer and a hydrophobic (fat or wax type material) component stabilized by the use of a suitable emulsifier. At Column 7, lines 10-30 it is stated that the ratio of the components is critical for the specific use of the composition, described to preserve relatively low porous materials such as eggs, apples, grapefruit and the like. A similar ratio of the components of the unique composition of this invention are also critical to the use on baked or fried products. The Ukai patent lists water soluble polymers in Column 8, lines 35-40, which include hexosans, starches, etc. One of the preferred materials in the compositions of matter of this invention is a low DE corn syrup solid, which is a hexosan. In Column 8, lines 52-57 there is a list of the hydrophobic substances including lipids and waxes which may be used.

In the article by Walters, G. "Stabilized Raisins for Dry Cereal Products," Food Technology at Pg. 236, May 1961, there is described the use of beeswax dispersed in vegetable oil as a moisture coating. While the oil reduces the moisture barrier properties of the wax and should reduce the problems of applying a thin continuous coat of the wax, a principle difficulty which we have found in our work limited the use of waxy materials on donuts, we have found that this specific teaching does not produce a satisfactory precoat water barrier on donuts.

In Werbin, D. U.S. Pat. No. 3,526,515, there is a description of coating of baked foods with a blend of oil or hydrogenated shortening and a high melting fat. We have found that such a coating is not satisfactory for the baked and fried food products of this invention.

The above referenced literature and patents describe the scope and content of the prior art and in many instances the same or similar compositions were tested or evaluated as a precoating of the water barrier type for baked and fried type and specifically yeast glazed raised donuts. None were found to have the combination of properties required to produce a satisfactory yeast raised glazed donut having an extended shelf life which still retained satisfactory eating properties. Thus, while the use of an edible coating to protect a food product from moisture loss is well known none of those described in the prior art have been found to solve the problem as is further indicated by the fact that an extended shelf life yeast raised glazed donut did not exist as a satisfactory commercial product prior to this invention. Other teachings of the prior art such as the use of an overwrap on the food products with a suitable packaging film to reduce moisture migration as taught by the prior art does not prevent moisture migration between the various components of a multicomponent food product and hence is unsatisfactory.

Accordingly our work was directed to providing an edible coating which could be applied in such a manner as to isolate one product component from another, and in this specific instance, to isolate the donut from its glaze with a water barrier to prevent or materially delay moisture migration. The prior art teachings of coatings in the literature which are removed with the peels or skin; which are removed during the processing such as baking or reheating prior to consumption; or as are applied to relatively non-porous firm products such as apples, nuts and the like which permit a very thin film to be applied are not directly related to our situation, which presented a problem which required the solution first provided by this invention.

In the case of a baked or fried food product the surface of the food is very porous and in many cases is soft and flexible. When coatings such as waxes or triglycerides are applied to such a surface two major problems are encountered. The first is the inability to apply a thin coating which will provide the water barrier protection, yet not have thick spots which would interfere with the normal eating properties. The second problem is the ability to provide a coating which has the required flexibility or elasticity so that it will not chip, crack, etc. when the food product is slightly deformed during handling or transit.

SUMMARY OF THE INVENTION

The precoat moisture barrier water in oil emulsion composition of matter preferred and described below comprises the following ingredients or elements: a saccharide or polysaccharide, and preferably a low DE corn syrup solid in an amount between about 6% and 40% and peferably at about 26.0%. Water in an amount from about 12% to 43% and preferably about 36.4% (allowing for a 10% water loss during preparation); and acetylated monoglyceride in an amount from about 25% to 75% and preferably about 36.4% and a flavor ingredient, such as vanilla, in an effective amount and preferably from about 1.2%.

It should be understood that the preferred composition has been determined on the basis of extensive work to be the optimum for the composition of material for the coating of yeast raised donuts. However, it should be understood that variations in the amounts may be made which will not depart from the scope of this invention and the optimum composition for other baked or fried products such as sweet goods, cakes, rolls, bread and the like can be readily determined for each specific application.

The moisture barrier precoating material is prepared by the process described generally as follows: The water is heated to boiling and gradually the low DE corn syrup solids are mixed in, taking care that during the addition of the corn syrup solids lumping does not occur. The acetylated monoglyceride component is first melted and then is added to the aqueous solution of the corn syrup with a relatively slow agitation until a water in oil emulsion is formed. Sufficient agitation to effect an emulsion is required, however, overagitation will produce over aeration. Undermixing will result in a lack of emulsification while overmixing can cause aeration which will reduce the effectiveness of the coating, reduce its transparency and increase its viscosity. Preferably a water in oil type of emulsion (or colloidal dispersion) is formed in which, the aqueous phase is dispersed as droplets throughout the continuous acetylated monoglyceride phase.

The surface temperature of the donut at the time of application of the coating should be between 90° to 100°

F. so that the coating material will set substantially rapidly but will not penetrate too deeply into the surface of the donut, while producing a thin, uniform coating which does not interfere with the eating characteristics of the donut. For best results the temperature of the coating composition of matter should be at approximately 140° F. but may be satisfactory if at between 110° F. to less than 180° F. and should be agitated to minimize separation or breaking of the emulsion.

The coating may be applied to the surface of the product by any practical mechanical means such as dipping, spraying, brushing or a water fall. It is important to remove the excess of the coating, again by any practical means such as air blowdown, mechnical vibration, or centrifuging while at the same time minimizing external markings due to support of the donut during drying or setting of the coating. Major marking of the donut's surface will reduce its moisture marking properties.

BRIEF DESCRIPTION OF THE DRAWINGS

The drawing is a photograph of three test donuts compared to three control donuts on the third day after they were made. The test donuts were precoated in accordance with the teachings of this invention and the control donuts made from the same dough composition and utilizing the same composition were not precoated.

DESCRIPTION OF THE PREFERRED EMBODIMENT

As described above the composition of matter of the precoat moisture barrier matter of this invention is a water in oil emulsion or colloidal dispersion prepared from an emulsified triglyceride or an emulsifier only a combination with an aqueous solution of a dextrin or other soluble saccharide or polysaccharide utilized. Suitably emulsified triglycerides or acetylated monoglycerides may be used. For example, "Myvacet 5-07", the trademark for a product of Eastman Chemical Products, Inc., Kingsport, Tenn., is illustrative of the satisfactory acetylated monoglyceride useful as a component of the composition of matter of this invention. Such materials are relatively insoluble in water but will form an emulsion with water and will also act as an emulsifying agent. Other materials successfully used for the oil portion of the emulsion include triglyceride which is an all purpose shortening, permissibly including the addition of partially hydrogenated flakes, in combination with a monoglyceride to provide the emulsion formation and stabilization. Certain waxes, such as rice wax, have also been found to provide excellent moisture barrier properties when used in combination with various polysaccharides. Similarly, it can be stated that satisfactory performances can be obtained using any lipid or waxy material which include suitable solids at room temperature to function satisfactorily, providing an emulsifier such as monoglyceride, to stabilize the water and the oil emulsion, is used.

For the saccharide or polysaccharide component of the composition of matter of this invention one example is "Frodex 10", a trademark for a low DE corn syrup solid product obtainable from American Maize Products Co., Hammond, Ind., which has found to be an excellent choice for the polysaccharide component of the coating emulsion of this invention. Tests evaluating the moisture barrier properties of other malto-dextrins, of which "Frodex 10" is an example, indicate that the moisture barrier properties decrease as the dextrose equivalent (DE—a measure of the degree of conversion from starch to monosaccharide of the corn syrup solid) is increased. We have also found practical considerations and limitations in the use of higher DE solids. With a material having a high dextrose equivalent there is an increase in the setting or drying time of the composition of matter. This is a practical limitation since it is desirable to utilize a composition of matter which, after it has been applied, will set or dry in a relatively short period of time so that the normal production rate of donuts will not be materially slowed down. In other words, if a high DE material is utilized which results in a long setting or drying time, a substantial increase in the amount of conveyor length would have to be utilized to permit an extended setting or drying time during transit. This would increase the cost of operation and probably not be practical from a commercial standpoint. This, of course, is a matter of choice and it is within the scope of this invention that the maximum dextrose equivalent of the material used may well depend on the application conditions, for example, if the setting or drying time was not a problem and other considerations were satisfactory a material having a higher DE than "Frodex 10" could be used. Also, we have found that pure dextrose having a DE of 100 did not produce a satisfactory emulsion nor did it produce a satisfactory coating. The ratio of dextrin component to water is controlled at the maximum by the solubility of the dextrin in water. Levels approaching the saturation point have been found desirable. Use of excess water serves no purpose and on the other hand could have an effect of reducing the setting time of the coating or of causing emulsion instability.

Sucrose has been found to be acceptable saccharide for use of that component of the coating composition of this invention, especially if coupled with small amounts of gums, such as gum arabic or dextrins such as "Crystal Gum" from National Starch and Chemical Corporation, Bridgewater, N.J., since sucrose has a tendency to reduce emulsion stability and increase setting times.

Other dextrins such as "Film Set" a trademark for a food grade dextrin from National Starch and Chemical Corporation, have also been found to be acceptable as the polysaccharide element or portion and it is within the scope of this invention that most commonly utilized polysaccharides would be functional in the composition of matter of this invention.

As indicated above, the preferred oil portion of the composition of matter of this invention is an acetylated monoglyceride of which "Myvacet 5-07" is typical. Tests were conducted to determine appropriate levels of acetylated monoglycerides and a level of about 36% as described above has been determined to be the optimum. As the level of the acetylated monoglycerides increases in the emulsion, the coating becomes heavier. This is not necessarily detrimental in some applications to baked or fried food products, since the specific product involved may permit higher levels than are optimum for yeast raised glazed donuts. Decreasing the level of acetylated monoglycerides as an oil and emulsifying agent portion of composition of matter below 30% results in a viscosity increase possibly because the emulsion stability is increasing. Decreasing of the acetylated monoglycerides to 25% results in a thin coating which requires a long setting time probably due to excess or free water in the emulsion.

The preferred acetylated monoglycerides which form the oil and emulsifying agent portion of the composition of matter of this invention have unique properties making them suitable for use in accordance with the teachings of this invention. They can be crystalized into the alpha form which makes them very stable and when applied to the produce results in a non-greasy but waxy coating. Non-acetylated monoglycerides are not stable in alpha form. This is probably why acetylated monoglycerides are superior to the combinations of triglycerides and monoglycerides as the oil portion of the precoat composition of this invention. In addition, acetylated monoglycerides have significantly lower melting points than non-acetylated monoglycerides. Acetylated monoglycerides tend to form an unordered network of interlocked ribbon like crystals while unacetylated monoglycerides crystals merge into fragments of unordered crystals. This characteristic may also explain partially why acetylated monoglycerides form a more stable emulsion type of coating than do triglycerides.

In general, the commercial forms of acetylated monoglycerides which have been utilized in our experimentation are Myvacet 5-07 from Eastman Chemical Products, Inc., Kingsport, Tenn. and Cetodan 50-00A from Grindstead Products, Inc., Overland Park, Kans., have the following properties:

| Properties: | Mycavet 5-07 | Cetodan 50-00A |
|---|---|---|
| Monoglyceride Content | 18% | 10% |
| Acetylation Content | 50% | 50% |
| Iodine Value | 3 maximum | 3 maximum |
| Saponification Value | 278-292 | 280 |
| Melting Point | 41-46°0 C. | 38-42° C. |
| Source Fat | Hydrocottonseed oil | Hydro refined Lard |

Both Myvacet 5-07 and Cetodan 50-00A are acetostearins with a substantial amount of palmitic acid. Both have emulsifying powers which make them a good constituent of an acetylated monoglyceride/polysaccharide water barrier precoating material.

In evaluating the precoat compositions of this invention in connection with yeast raised donuts, we have utilized three types of data collection techniques to obtain both subjective and objective evaluations of the resultant effect. The first of these is to measure weight loss of identically prepared donuts, a control donut having no precoat and the test donut having the precoat composition in accordance with the teachings of this invention. In one such test it was found that after 72 hours the weight loss of the controlled donut which was uncoated was 19.82% as compared to 6.12% for the same donut precoated in accordance with the teachings of this invention. In a repeat of that test it was found that the 72 hour weight loss of the uncoated donut was 25.5% as compared to 6.99% for the same donut precoated in accordance with the teachings of this invention. In addition, donuts were subjected to organoleptic evaluation by panels who were given control or standard donuts to compare with the same donuts to which had been applied the preferred composition of matter in the manner described above. The results of the panels' evaluations indicates that the precoat composition of matter applied as taught above significantly improves the quality of the donuts and appears to be the most important feature in achieving a successful glazed yeast raised donut for an extended shelf life.

The other objective test involved the use of a standard "Instron" instrument for measuring the relative softness of donuts. In a typical test the one day softness of donuts made with the same formulation which had not been precoated were compared to donuts which had been precoated in accordance with the teachings of this invention and the one day softness values compared as well as the four day softness values compared. This test demonstrated that the one day softness increased from 187 to 127 for the precoated donuts and for the four day softness, the uncoated had an Instron value of 486 as compared to the increased softness of 232 obtained with respect to the donut which had been precoated in accordance with the teaching of this invention.

It is important to understand that the results to be achieved by the utilization of the composition of the matter and the process of this invention to provide an effective moisture barrier precoat are in many respects subjective. While objective measures of moisture loss (weight loss) and softness, as measured by an Instron instrument, can be obtained and are described above, the subjective quality as represented by the test panel data and particularly the physical appearance of a standard glaze yeast raised donut as compared to the glazed yeast raised donut of this invention is very important from a commercial point of view.

The photograph of the drawing was taken of precoated versus unprecoated donuts and graphically illustrates the effect of glaze stabilization results achieved as a direct result of the use of the precoat composition of the matter of this invention. When identical donuts were prepared and mechanically glazed with an identical glaze at exactly the same time, it was found that after three days the unprecoated donuts had an unstable glaze whereas the glaze on the precoated donuts made in accordance with the teachings of this invention showed no sign of glaze breakdown.

During the course of our work, tests were conducted to examine the effect of surface temperature of the donut at the time of application of the precoating to determine the functional effect. As a result of extensive testing it has been found that the temperature of the donut's surface should be between about 90° and 100° F. and that the temperature of the agitated precoating composition should be at about 140° F. Since donuts normally leave the frier with a surface temperature of approximately 200° F., it is therefore desirable and important from a functional point of view to reduce the surface temperature (but not necessarily the internal temperature) of the freshly fried donut from its approximately 200° F. temperature to the 90° F. to 100° F. range.

During the course of our work we examined the utilization of spreading agents, a part of the composition of matter. In that regard polysorbate 60 was utilized as a part of the composition. Such materials are satisfactory where a spreading agent will materially assist in the application of thin uniform coating of the composition utilized to the product being precoated. However, where dipping techniques or coating application techniques are satisfactory to produce the desired thin uniform coating such spreading agents may be unnecessary.

As noted above sucrose can be used effectively as the saccharide or polysaccharide component of the composition of matter. During the course of our work both sucrose and dextrose were evaluated as substitutes for the "Frodex 10" preferred polysaccharide. It was felt that sucrose can be used effectively, while it is still inferior to "Frodex 10", if used at higher concentrations to more nearly match the relative saturation of the preferred composition which include "Frodex 10", in solution.

Other work demonstrated that triglycerides or waxes cannot be substituted alone for acetylated monoglycerides. However, additional work demonstrated that when used with an emulsifier such as a monoglyceride, the triglycerides are functional to produce the desired results. The significance of this subsequent work is that the emulsion which is required to provide the necessary coating function does not form when only straight triglyceride is used. However, if a stable emulsion can be formed from a triglyceride it should work satisfactorily to provide a functional precoating.

One of the ways of obtaining an effective evaluation of the coating composition of matter and to determine whether a satisfactory water in oil emulsion has been obtained is to obtain a measure of the electrical conductivity of the solution as compared to water.

Other work has shown that there is a relationship between the temperature of the material and the satisfactory production of a suitable water in oil emulsion. Furthermore the preferred coating material should be substantially salt-free since the presence of excess of $\frac{1}{2}\%$ salt has the effect of tending to breakdown the emulsion or causes instability which should be avoided.

The degree of saturation of the saccharide or polysaccharide in the water phase appears to be functionally important. Thus, as indicated above, where "Frodex 42" from American Maize Co, Hammond, Ind., which has a higher DE corn syrup solid content is used either with or without gum arabic was not a satisfactory replacement for the "Frodex 10+, obtained from the same source unless the concentration was increased so as to correspond to the degree of saturation achieved in the optimum and preferred composition.

The following alternate formulas form satisfactory emulsions and produces satisfactory moisture barrier precoats for yeast raised glazed donuts.

EXAMPLE I

| Preferred Precoat Composition | | Weight | Percentage |
|---|---|---|---|
| Myvacet 5-07[1] | = | 700 gms | 36.36% |
| Water | = | 700 gms | 36.36% |
| Frodex 10[3] | = | 500 gms | 25.98% |
| Flavor (9:1 vanilla solution) | = | 25 gms | 1.30% |

EXAMPLE II

| | | Weight | Percentage |
|---|---|---|---|
| All Purpose Shortening | = | 200 gms. | 10.53% |
| Myvacet 5-07[1] | = | 450 gms. | 23.69% |
| Myverol 1800[2] | = | 50 gms. | 2.63% |
| Water | = | 700 gms. | 36.85% |
| Frodex 10[3] | = | 500 gms. | 26.3% |

EXAMPLE III

| | | Weight | Percentage |
|---|---|---|---|
| All Purpose Shortening | = | 300 gms. | 15.80% |
| Myvacet 5-07[1] | = | 350 gms. | 18.43% |
| Myverol 1800[2] | = | 50 gms. | 2.63% |
| Water | = | 700 gms. | 36.85% |
| Frodex 10[3] | = | 500 gms. | 26.3% |

EXAMPLE IV

| | | Weight | Percentage |
|---|---|---|---|
| All Purpose Shortening | = | 512 gms. | 26.96% |
| Myverol 1800[2] | = | 58 gms. | 3.04% |
| Water | = | 776 gms. | 40.85% |
| Frodex 10[3] | = | 554 gms. | 29.15% |

[1]Myvacet 5-07 - Acetylated monoglyceride from Eastman Chemical Products Inc., Kingsport, Tenn.
[2]Myverol 1800 - an emulsifying agent from Eastman Chemical Products Inc., Kingsport, Tenn.
[3]Frodex 10 - a trademark for a low DE corn syrup product from American Maize Products Co., Hammond, Indiana.

Preparation Procedures

These compositions were prepared by first boiling the water, gradually mixing in the polysaccharide element. The solution was then transferred to a Hobart mixer, to which was added the liquified oil portion and/or emulsifier and mixed at slow speed with a paddle to produce a water in oil emulsion. The resulting precoat water barrier material is applied to donuts in the manner described above.

In the following example the quantities of the three preferred materials were varied as indicated in order to establish the usefulness of the range of proportions of the materials to make up the water in oil emulsion. "Frodex 10" identified above was utilized as the polysaccharide component and "Myvacet 5-07" was utilized as the acetylated monoglyceride element. In each case a water in oil emulsion was prepared and utilized to precoat six donuts made from a standard formulation. Also, in each instance each of the oil in water emulsions was prepared in accordance with the description contained above. The variations in recipe are as set forth as follows:

EXAMPLE V

| Set | Frodex 10 gms. | Water gms. | Myvacet 5-07 gms. |
|---|---|---|---|
| 1 | 371 | 529 | 420 |
| 2 | 247 | 353 | 840 |
| 3 | 371 | 529 | 555 |
| 4 | 347 | 473 | 630 |
| 5 | 371 | 529 | 555 |
| 6 | 396 | 564 | 464 |
| 7 | 446 | 634 | 384 |
| 8 | 371 | 529 | 555 |
| 9 | 206 | 294 | 925 |
| 10 | 310 | 440 | 800 |
| 11 | 371 | 529 | 555 |
| 12 | 454 | 646 | 407 |

Each of the sets was used to coat six donuts which had been fried and kept in a plastic bag over night. The donuts were taken out and force cooled for five minutes exactly and the precoats were all used at a temperature between 175° and 180° F. Each of the donuts was dipped in the precoat emulsion. To evaluate the effectiveness of each of the various sets average weight losses were taken resulting in the following table of results:

| | Wt. Before Coating (gms.) | Wt. After Coating (gms.) | Coating Pick Up gms. | Coating Pick Up As % of Orig. Weight |
|---|---|---|---|---|
| 1 | 235 | 260 | 22.5 | 9.45% |
| 2 | 234 | 259.5 | 25.5 | 10.9% |
| 3 | 236 | 261 | 25 | 10.59% |
| 4 | 230 | 254 | 24 | 10.17% |
| 5 | 267 | 297 | 30 | 11.24% |
| 6 | 261.5 | 291.5 | 30 | 11.47% |
| 7 | 269.5 | 297.5 | 28 | 9.41% |
| 8 | 258.5 | 285.5 | 27 | 10.45% |
| 9 | 237 | 267 | 30 | 12.66% |
| 10 | 235 | 257 | 22 | 9.36% |
| 11 | 241 | 269 | 28 | 11.62% |
| 12 | 255.5 | 282 | 26.5 | 10.37% |

| Weight Loss 24 hrs. | Weight Loss 48 hrs. | Weight Loss 72 hrs. |
|---|---|---|
| 3.26% | 5.57% | 7.68% |
| 2.89% | 5.01% | 7.13% |
| 2.87% | 5.17% | 7.28% |
| 2.95% | 5.51% | 7.78% |
| 2.69% | 4.71% | 6.90% |
| 4.12% | 7.03% | 9.61% |
| 2.52% | 4.87% | 7.06% |
| 2.80% | 4.90% | 7.36% |
| 3.00% | 5.06% | 7.12% |
| 3.70% | 6.03% | 8.75% |
| 2.42% | 4.09% | 5.76% |
| 3.18% | 5.32% | 7.62% |

As a result it is to be noted that the acetylated monoglyceride component can be used at a level which may be varied from 27% to 65% with satisfactory results. Apparently this range can be extended below 27% and above 65% with satisfactory results subject to the comments set forth above. The polysaccharide portion of the sets was varied from 14.5% to 30%, however the percentage saturation of the aqueous phase was kept constant inasmuch as our work indicated that this was as important in maintaining a relatively short setting time.

In the various tests and evaluations described above standard donuts were compared to determine the efficacy of the precoat as a moisture barrier which would effectively increase the shelf life of yeast raised glazed donuts and not interfere with the eating qualities. The donuts themselves were prepared in accordance with standard formulas or were formulas which vary from standard formulas but in each instance the donuts were made from the same formulas. Similarly the glaze was either a standard sucrose-water-stabilizer glaze or a special formulation glaze. In each instance where the effect of the precoat was the item being evaluated, the formulations for the dough and the glaze was the same.

By way of summary we have found that a composition of matter comprising a water in oil emulsion or colloidal dispersion composed of a saccharide or polysaccharide at near saturation level in water; combined with an acetylated monoglyceride, or an equivalent oily element which has added to it an emulsifying agent sufficient that either the acetylated monoglyceride or the other oil element plus emulsifier element produces a standard water in oil emulsion is satisfactory for use as a precoat on freshly fried donuts or similar fried or baked products such as sweet goods, cakes, rolls, bread and the like and substantially increases the shelf life of donuts to which that composition is applied without interfering with the normal eating characteristics of the product. The product is dipped, sprayed or otherwise has applied to it a coating in accordance with the composition of matter taught by this invention at a temperature from 90° to 100° F. preferably by dipping in a bath of the precoating material which is at a temperature of from 110° to 180° F. The period of time that has been found to be ideal for the dip is a matter of one to two seconds and the characteristic of the water and oil emulsion is such that it preferably sets in a matter of seconds after the excess of the precoating material has been removed by suitable means.

Within the teachings of this application variations may be made without departing from the scope of the appended claims.

What is claimed is:

1. A method of providing a multicomponent baked or fried bakery food product with an edible effective moisture barrier which comprises:
   (a) preparing a substantially salt-free coating material of a water in oil emulsion comprising a uniform dispersion of droplets of a solution of 6% to 40% material selected from the group consisting of saccharide, polysaccharide or dextrin in 12% to 43% water in 25% to 75% oily substance selected from the group consisting of acetylated monoglycerides, or a triglyceride combined with an emulsifying agent and holding said emulsion at a first temperature at which it remains a stable liquid;
   (b) cooking said bakery food product and reducing the temperature of the surface thereof to a temperature which is less than the first temperature of said coating material;
   (c) applying said emulsion to the cooler surfaces of said product to provide a thin uniform coating on said surface whereby moisture migration is inhibited;
   (d) setting said uniform coating prior to any further processing of said product; and
   (e) icing said food product with said uniform coating being present between said product and said icing.

2. The method of claim 1, wherein about 36% acetylated monoglyceride is used.

3. The method of claim 1, wherein about 26% dextrin is used.

4. A method of providing a shelf stable glazed yeast raised donut which comprises:
   (a) preparing a substantially salt-free water in oil emulsion comprising a solution of about 26% low DE corn syrup solids, about 37% water and about 37% acetylated monoglycerides and holding said emulsion at about 110° F. to 180° F;
   (b) preparing a yeast raised donut dough, forming donut pieces therefrom and frying said donut pieces to a temperature of about 200° F;
   (c) cooling said fried yeast raised donut to a temperature of about 90° to 100° F;
   (d) applying said emulsion to the surfaces of said yeast raised donut for a period of time sufficient to provide a thin uniform coating on the surface of said donut to inhibit moisture migration;
   (e) drying said moisture inhibiting coating;
   (f) preparing a sucrose-water-stabilizer glaze; and
   (g) coating said glaze on said dried moisture inhibiting coating.

* * * * *